(12) United States Patent
Riddle (10) Patent No.: US 9,039,471 B1
(45) Date of Patent: May 26, 2015

(54) SURFBOARD WITH AIR-FILM CREATING VENTS

(71) Applicant: Shaun Riddle, Northglenn, CO (US)

(72) Inventor: Shaun Riddle, Northglenn, CO (US)

(*) Notice: Subject to any disclaimer, the term of this patent is extended or adjusted under 35 U.S.C. 154(b) by 0 days.

(21) Appl. No.: 14/254,943

(22) Filed: Apr. 17, 2014

(51) Int. Cl.
*B63B 35/79* (2006.01)

(52) U.S. Cl.
CPC ................... *B63B 35/7906* (2013.01)

(58) Field of Classification Search
CPC ........................................ B63B 35/79
USPC ..................... 114/288–289; 441/74
See application file for complete search history.

(56) References Cited

U.S. PATENT DOCUMENTS

| | | | |
|---|---|---|---|
| 5,447,459 A * | 9/1995 | Hammond | 441/135 |
| 6,428,376 B1 * | 8/2002 | Reeder | 441/65 |
| 6,572,424 B2 * | 6/2003 | Harkrider | 441/135 |
| 7,582,238 B1 * | 9/2009 | Yomazzo et al. | 264/45.7 |
| 7,814,853 B2 * | 10/2010 | Adams | 114/43 |
| 8,113,895 B2 * | 2/2012 | Watanabe | 441/74 |
| 8,622,013 B2 * | 1/2014 | Keller | 114/291 |
| 8,727,824 B2 * | 5/2014 | Reeves et al. | 441/74 |
| 8,900,022 B2 * | 12/2014 | Clark | 440/69 |
| 2009/0286433 A1 * | 11/2009 | Watanabe | 441/74 |
| 2012/0088417 A1 * | 4/2012 | Reeves et al. | 441/74 |

* cited by examiner

*Primary Examiner* — Lars A Olson
*Assistant Examiner* — Jovon Hayes
(74) *Attorney, Agent, or Firm* — J. Wiley Horton (57) ABSTRACT

An air vent that passes from the deck of a surfboard through to its bottom. The vent may have a wide variety of shapes. The trailing boundary of the vent's lower portion is preferably inclined forward toward the surfboard's nose. The inclination serves to prevent water flowing upward. Instead, air is entrained by the water flowing across the vent's bottom exit and pulled downward. A portion of the entrained air flows rearward out of the bottom exit along the surfboard's bottom. This entrained air forms an air film between the board's bottom and the surrounding water, thereby reducing friction.

20 Claims, 10 Drawing Sheets

SURFBOARD WITH AIR-FILM CREATING VENTS

BACKGROUND OF THE INVENTION

1. Field of the Invention

This invention relates to the field of surfboards. More specifically, the invention comprises a surfboard with vents that transfer air from the deck to the bottom, where a portion of the air becomes entrained in the water flow and creates an air-film beneath the board.

2. Description of the Related Art

Surfboards were invented by ancient Polynesians. They were originally carved from straight sections of tree trunk and were typically 3-4 meters (10-15 feet) in length and weighed as much as 70 kg (150 pounds). The sport of surfing expanded greatly in the years following World War II. The expansion of the sport was propelled in part by the availability of new materials for constructing surfboards. The widespread availability of fiberglass was a significant factor.

Modern surfboards are typically made by bonding a high-strength "skin" material to a low density/low strength "core" material. The core material is often polyurethane or polystyrene foam, but may also be natural materials such as balsa wood. The skin is made by covering the core with a material such as woven fiberglass cloth. The woven cloth is bonded to itself and the core using polyester or epoxy resin.

Figure 1:
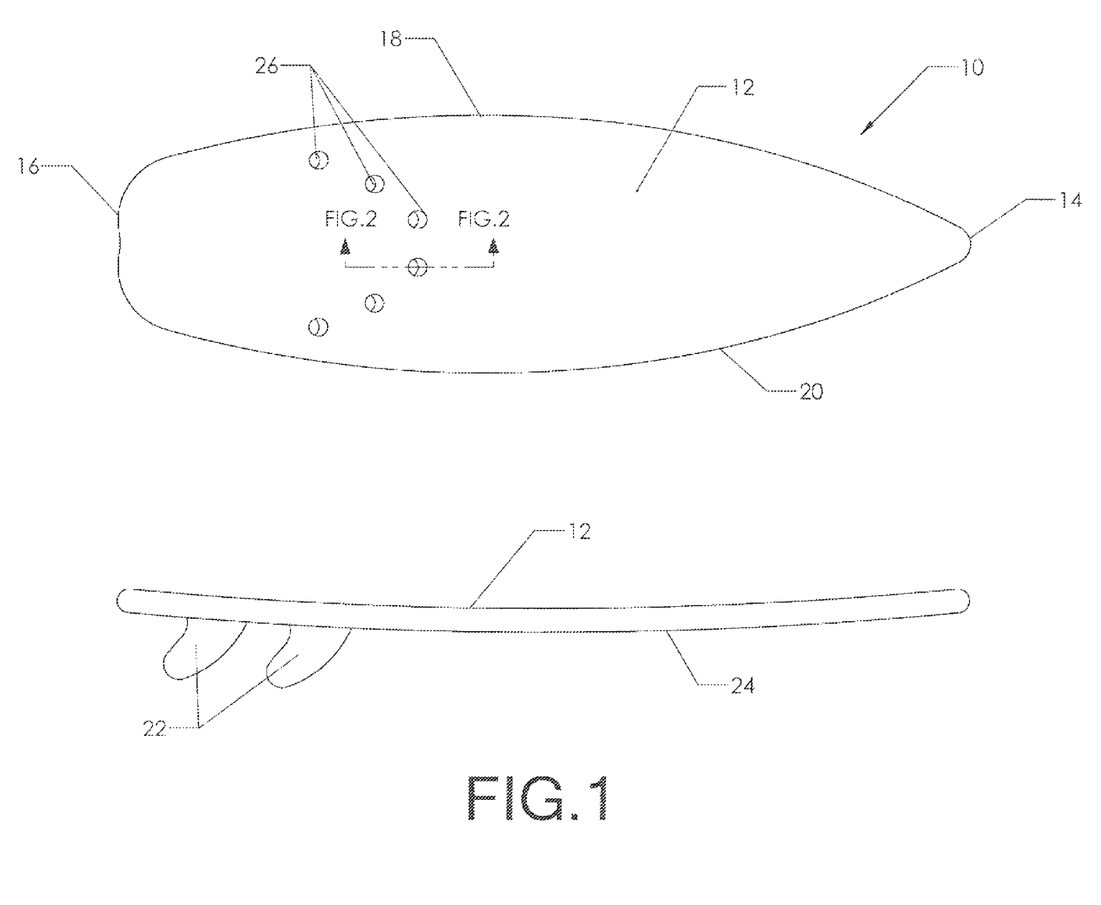
FIG. 1 is a plan and elevation view depicting a common type of surfboard with the addition of the present invention.

FIG. 1 shows a plan and elevation view for a representative surfboard. Those skilled in the art will now that a virtually endless variety of surfboards are now in common use. Thus, the board shown in FIG. 1 is properly viewed as one example among many possibilities. However, all surfboards share some common characteristics and these have been labeled in FIG. 1 in order to benefit the reader's understanding.

The top of the surfboard is known as deck 12. The forward portion is known as nose 14, while the aft portion is known as tail 16. The board's lateral boundaries are generally referred to as "rails" (left rail 18 and right 20). The board's downward facing surface is known as bottom 24.

FIG. 1 is not labeled as "prior art" because the surfboard depicted includes the present invention (vents 26). Its other features are common to prior art boards, however, and thus it is still useful for discussing the background of the invention. It is common for modern surfboards to include one or more skegs 22. These prevent lateral slipping and aid in turning the board. Other features may be included, such as an attachment point for a "leash" that is used to link the board to one of the surfer's ankles.

The board shown in FIG. 1 is known for being fairly agile, meaning that it can be quickly turned. It has a fairly broad beam and a relatively short length (in comparison to traditional "long boards"). When a rider is riding the board such as shown in FIG. 1, only the aft portion will engage the water. How much of the board is in contact with the water depends on many factors. However, it is common for at least a substantial portion of the board's forward region to be free of the water.

The surface friction generated by the interaction of the board's bottom with the water is a significant factor in determining the speed the surfer is able to achieve. Surfboards are commonly smoothed and waxed in order to minimize the friction between the board's bottom and the water. However, smoothing and waxing will only increase the board's speed to a certain extent. It is desirable to further increase the board's speed by further reducing friction. The present invention provides such an enhancement.

BRIEF SUMMARY OF THE INVENTION

The present invention comprises one or more an air vents that pass from the deck of a surfboard through to its bottom. The vent may have a wide variety of shapes. The trailing boundary of the vent's lower portion is preferably inclined forward toward the surfboard's nose. The inclination serves to prevent water flowing upward. Instead, air is entrained by the water flowing across the vent's bottom exit and pulled downward. A portion of the entrained air flows rearward out of the bottom exit along the surfboard's bottom. This entrained air forms an air film between the board's bottom and the surrounding water, thereby reducing friction.

REFERENCE NUMERALS IN THE DRAWINGS

| | REFERENCE NUMERALS IN THE DRAWINGS | | |
|---|---|---|---|
| 10 | surfboard | 12 | deck |
| 14 | nose | 16 | tail |
| 18 | left rail | 20 | right rail |
| 22 | skeg | 24 | bottom |
| 26 | vent | 28 | central axis |
| 30 | core | 32 | deck skin |
| 34 | bottom skin | 36 | wall skin |
| 38 | air/water boundary | 40 | entrained air |
| 42 | air film | 44 | water flow |
| 46 | lifted flow | 48 | cavity |
| 50 | pipe | 52 | resin fillet |
| 54 | bottom exit | 56 | top exit |
| 58 | leading boundary | 60 | trailing boundary |

DETAILED DESCRIPTION OF THE INVENTION

The present invention involves one or more vents passing through a surfboard from top to bottom. The vents are used to create an air film beneath the trailing portion of the board as it moves through the water. A broad air film is preferably created. In order to create such a film, an array of two or more vents are included in a suitable pattern. The top view of FIG. 1 shows such an array. Six vents 26 are provided in this embodiment.

Figure 2:
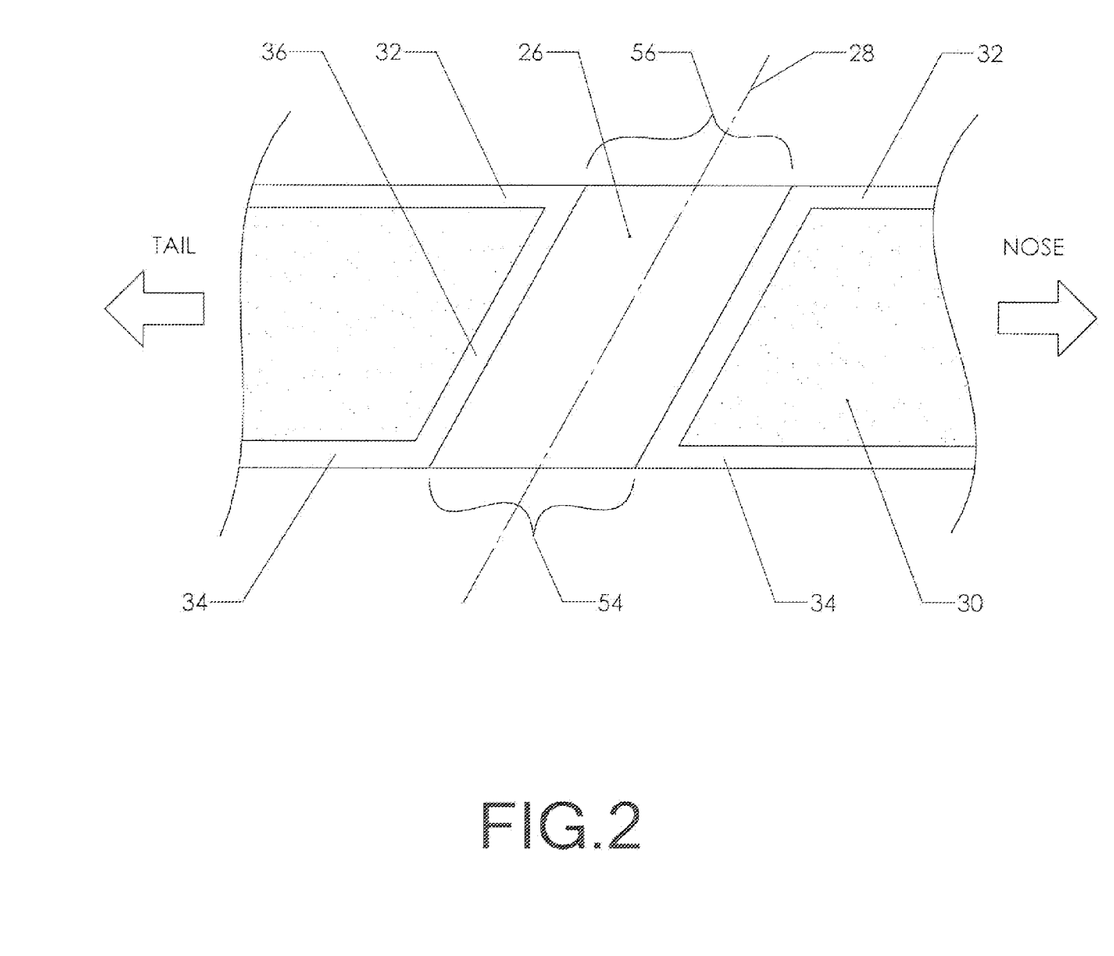
FIG. 2 is a detailed section view, showing a vent made according to the present invention.

FIG. 2 depicts a sectional elevation view of one of the vents 26 shown in FIG. 1. Vent 26 passes vertically through the surfboard. The board in this example includes a typical construction used for modern surfboards. Core 30 defines the overall shape of the board. Deck skin 32 is made by laying one or more layers of woven cloth (fiberglass, KEVLAR, or other more exotic materials such as carbon fiber) over the upper surface of the core and bonding it using a liquid resin material that transitions to a strong solid. Examples of the resin include polyester and epoxy.

The reinforcing cloth and bonding resin surround and bond to core 30 on all sides. Bottom skin 34 is the portion of the bonded reinforcing cloth that lies over the bottom of the board. In this example, vent 26 is simply an inclined cylindrical cavity having central axis 28. The cylindrical cavity intersects the deck at top exit 56. It intersects the bottom at bottom exit 54.

It is undesirable to expose any portion of the core material since it has little toughness or abrasion resistance. Thus, it is preferable to provide wall skin 36 around the perimeter of vent 26. Wall skin 36 may be formed using a variety of techniques. It is preferable for wall skin 36 to be bonded to deck skin 32 and bottom skin 34.

The reader will observe that the nose of the surfboard lies off to the right of the cross section, and the tail lies off to the left. Vent 26 is therefore inclined so that its upper portion lies close to the nose and its lower portion lies closer to the tail. This geometry is significant to the operation of the vent.

Figure 3:
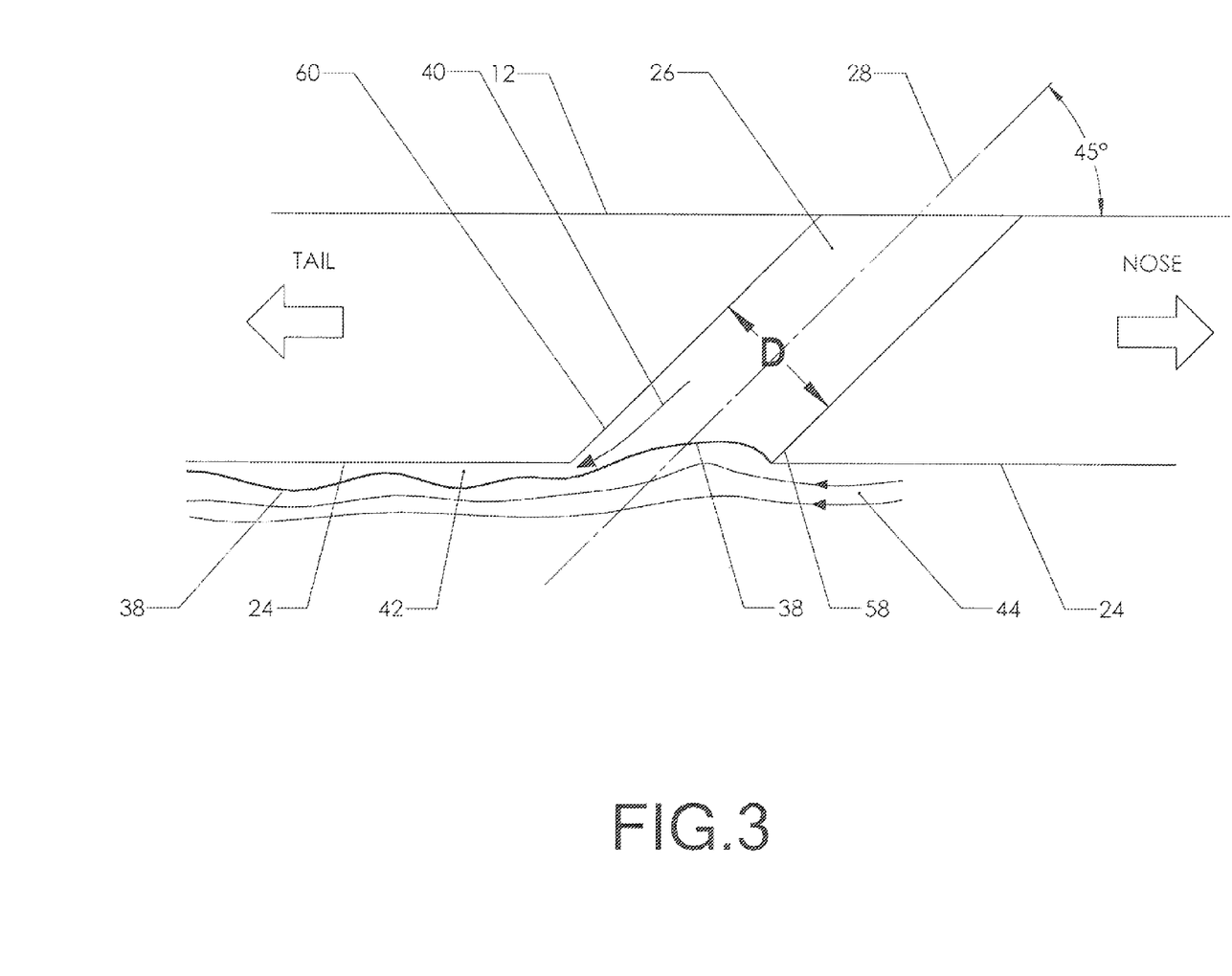
FIG. 3 is a detailed elevation view, showing the operation of the present invention.

FIG. 3 shows the same geometry as the surfboard is moved rapidly through the water. The bottom exit region of vent 26 includes leading boundary 58 and trailing boundary 60. Water flow 44 slides rapidly along bottom 24 in the direction indicated by the arrow. As the water moves aft past leading boundary 58, air/water boundary 38 moves up into vent 26. This phenomenon is well known in the field of fluid mechanics and is commonly referrer to as "hydraulic jump."

As the moving water approaches trailing boundary 60, however, a different phenomenon occurs. The inclined surface of trailing boundary 60 causes some air to be entrained and pulled beneath the board (entrained air 40). Once this entrained air is aft of the vent, it cannot easily escape to the surface and must instead travel along the bottom of the board. Air film 42 is thereby created. As is well known to those skilled in the art, the creation of such an air film substantially reduces the sliding friction between the bottom of the surfboard and the water.

The vent shown in FIG. 3 is a simple cylindrical bore drilled through the surfboard (having a diameter "D"). This simple shape produces the desired effect. It is readily apparent that other shapes could produce the desired effect as well. The important element is the inclination of trailing boundary 60. The inclination of leading boundary 58 is relatively unimportant. This portion may simply be vertical, or may even be inclined in the opposite direction as trailing boundary 60.

Figure 4:
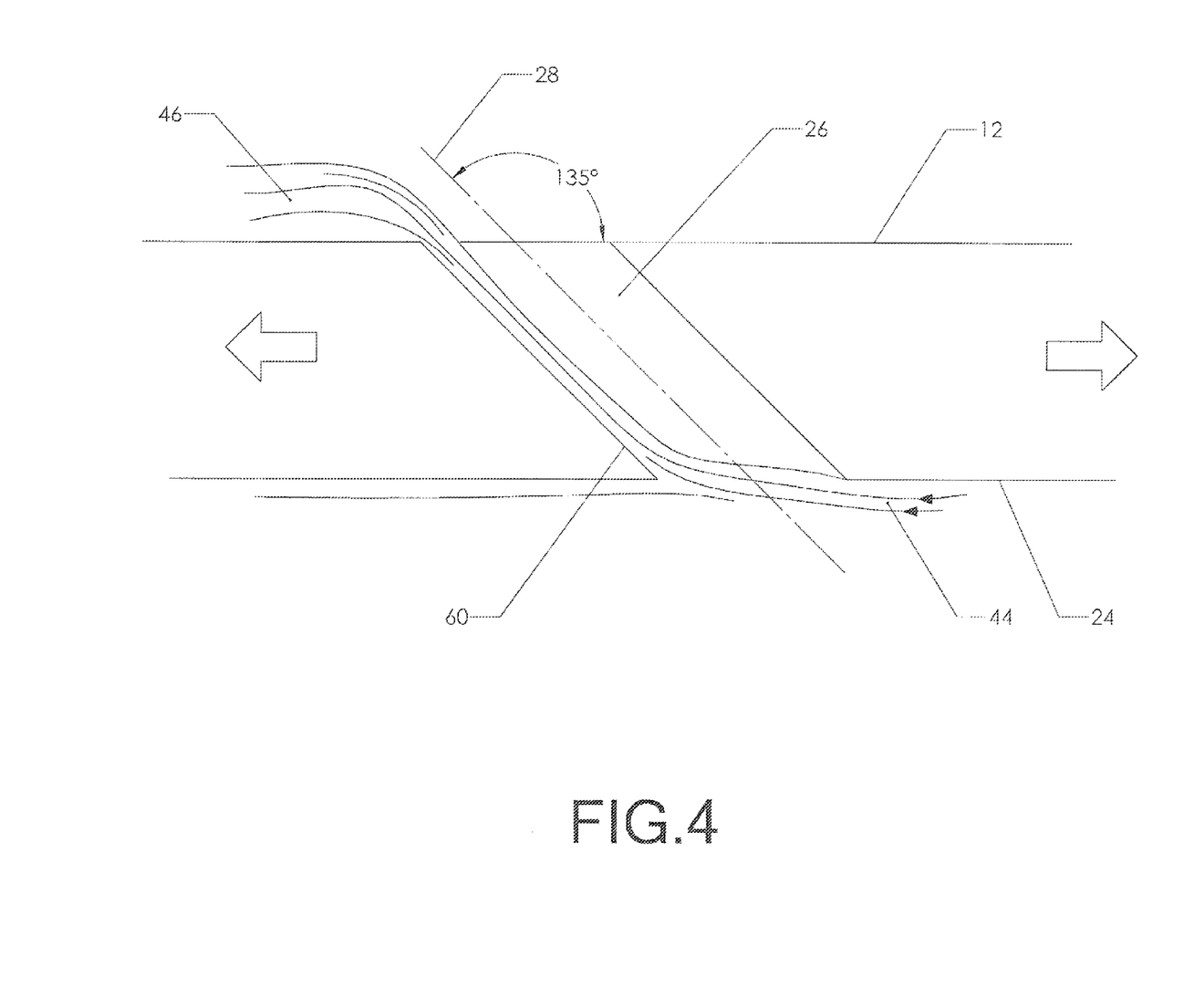
FIG. 4 is a detailed elevation view, showing how the orientation of the present invention is significant to its operation.

FIG. 4 provides air extreme illustration of the importance of properly inclining trailing boundary 60. In the example of FIG. 4, trailing boundary 60 is inclined so that its lower portion is closest to the nose and its upper portion is closest to the tail. Water flow 44 slides along the bottom of the board as for the example of FIG. 3, but no air is entrained. Instead, lifted flow 46 is "scooped" up through vent 26 and propelled onto deck 12. This configuration obviously does not produce the desired effect. It is important to realize that the example of FIG. 4 is not an embodiment of the present invention. It is not really prior art, however, since the inventor is not aware of a board having this precise configuration (though some prior art boards have incorporated scoops intended to spray water upwards). FIG. 4 merely serves to illustrate—by way of an extreme example—how the inclination of trailing boundary 60 is important to the operation of the present invention.

Figure 5:
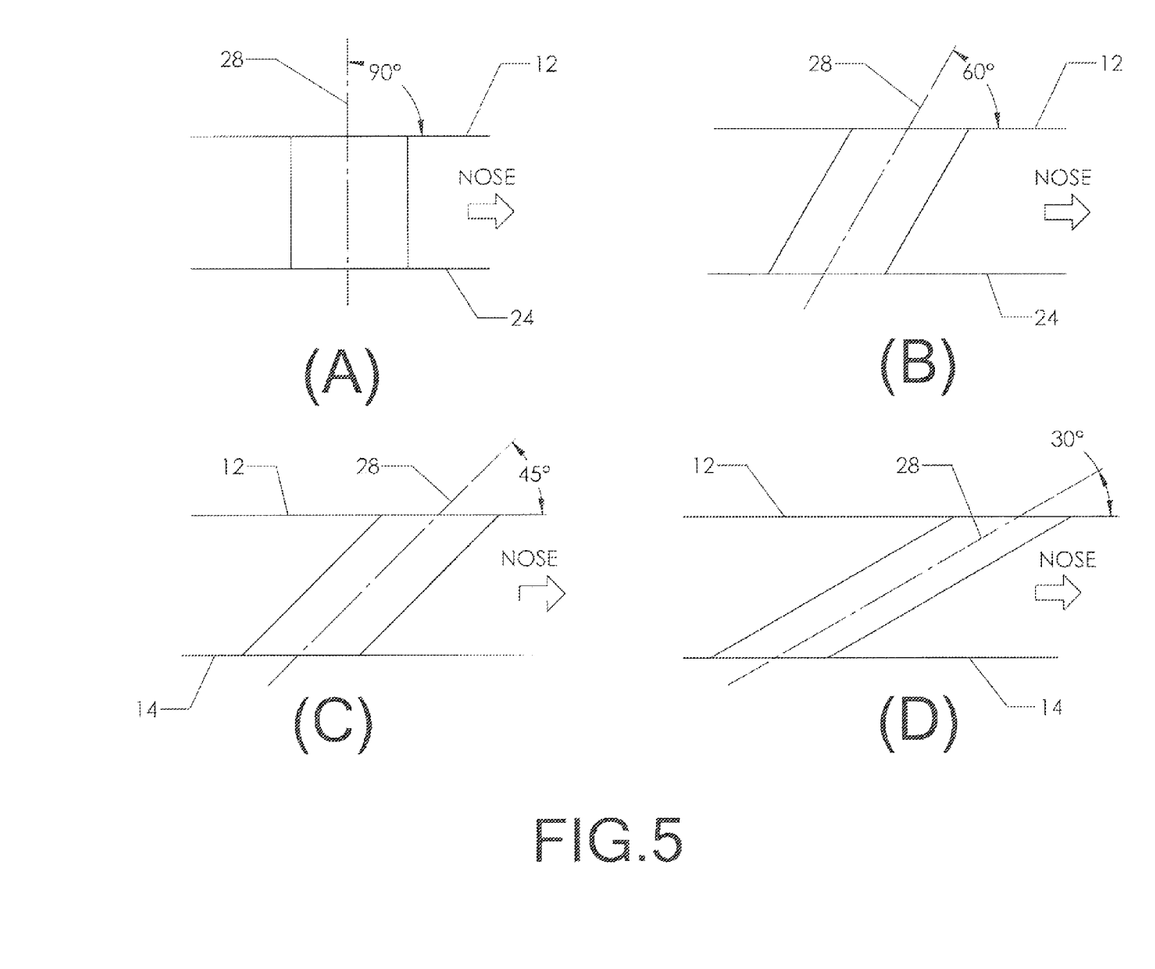
FIG. 5 depicts four different orientations for the present invention.

FIG. 5 shows several examples of vents formed by creating a simple cylindrical cavity having a central axis 28. In FIG. 5(A), central axis 28 is perfectly perpendicular to deck 12. In FIG. 5(B), central axis 28 is tilted forward with respect to deck 12. The angle between the central axis and the deck in this example is 60 degrees. FIG. 5(C) shows an example where the angle is 45 degrees, and FIG. 5(D) shows an example where the angle of tilt is 30 degrees. The example of FIG. 5(A) entrains some air but is not very effective. The other examples work better, with the preferred embodiment being about 45 to 60 degrees.

Figure 6:
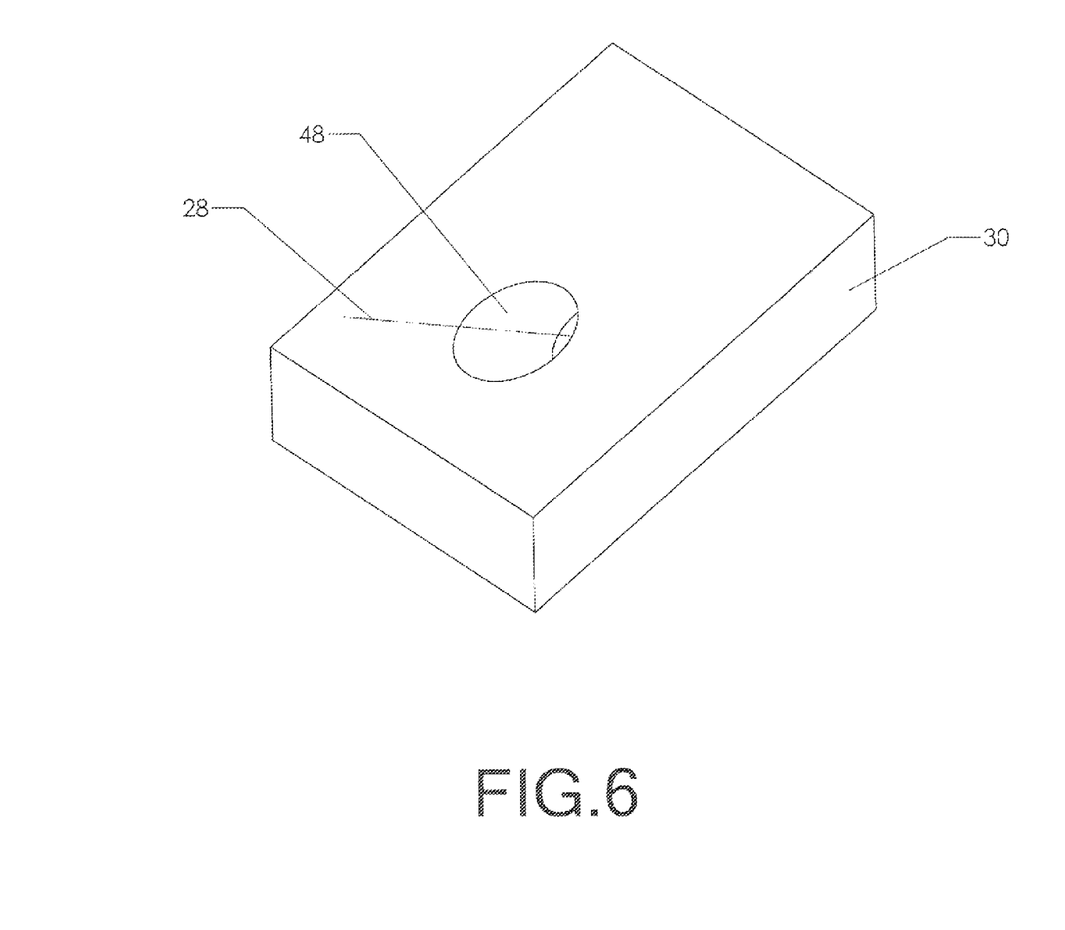
FIG. 6 is a detailed perspective view, showing one method of manufacturing the present invention.
Figure 7:
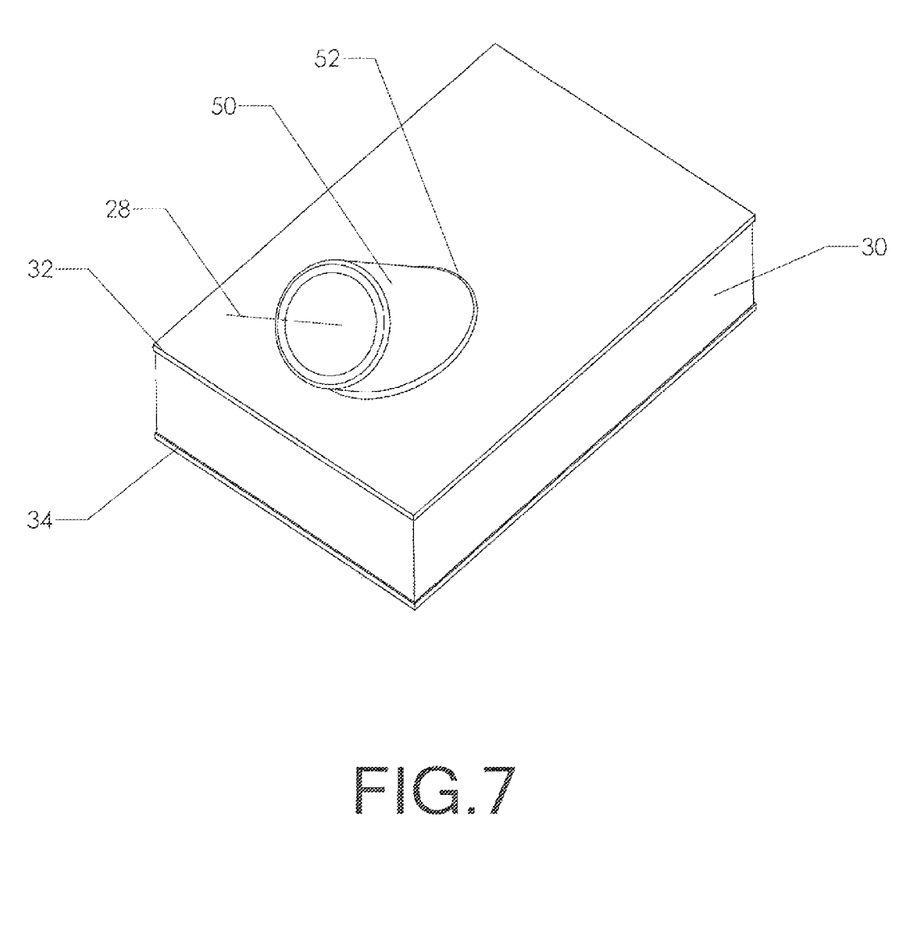
FIG. 7 is a detailed perspective view, showing one method of manufacturing the present invention.
Figure 8:
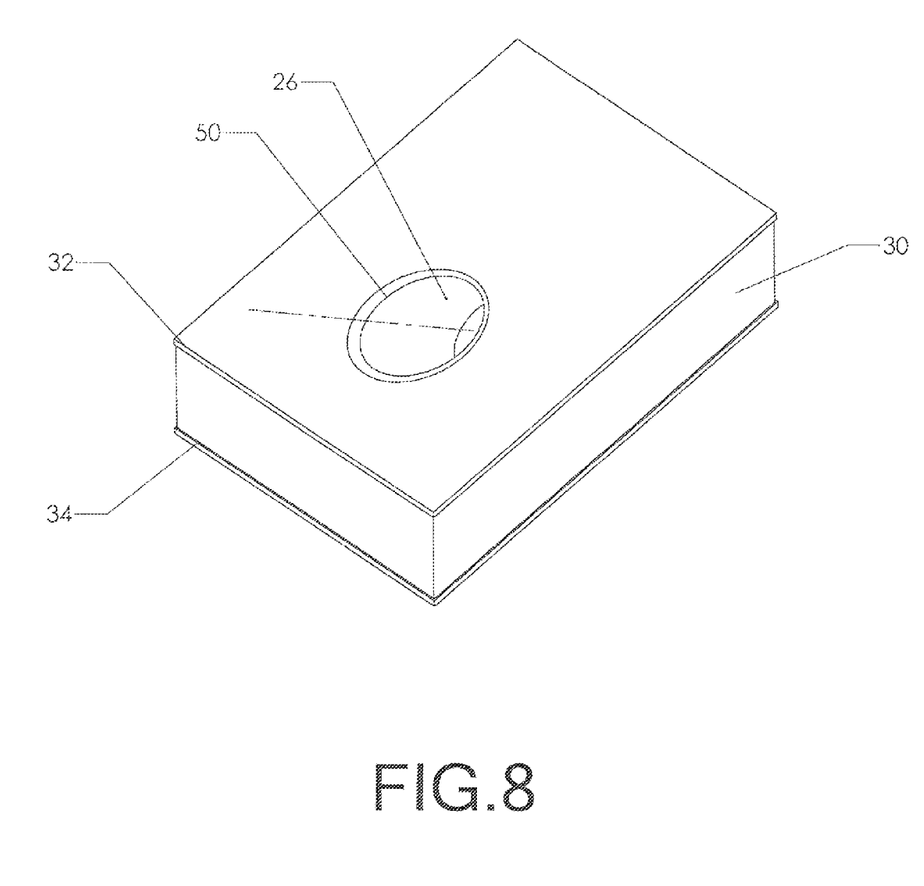
FIG. 8 is a detailed perspective view, showing one method of manufacturing the present invention.

Although the invention is not limited to any particular construction technique, the reader may wish to know some information regarding the construction of suitable vents in a typical surfboard. FIGS. 6-8 provide illustrations of one suitable process.

FIG. 6 shows a small section of core 30 used to create a surfboard. Only the section immediately surrounding the location of a vent is shown. Cavity 48 is made through core 30. The cavity may be drilled by passing a drill bit along central axis 28. Alternatively, the cavity may be cast into the core material at the time the core material itself is cast.

As stated previously, it is preferable to provide a wall skin in the cavity. In FIG. 7, pipe 50 has been added to the cavity by gluing it in position. The pipe may be a PVC extrusion, a fiberglass composite, or even a piece of metal tube. Once the pipe is in position, deck skin 32 and bottom skin 34 are added. The deck and bottom skins are preferably bonded to the pipe. Resin fillet 52 may be formed when the resin is used to soak and bond the woven reinforcing cloth used to make the deck and bottom skins.

In the assembly as shown, a portion of pipe 50 sticks up beyond the deck and a second portion (not shown) protrudes down below the bottom. The protruding portions are cut off and the boundaries are sanded smooth. FIG. 8 shows the result. Pipe 50 is sanded smooth with deck skin 32 and bottom skin 34. The resulting vent 26 is thereby bounded within a "wall skin" (the pipe). Additional adhesive and/or filler material may be used to dress the joints.

Figure 9:
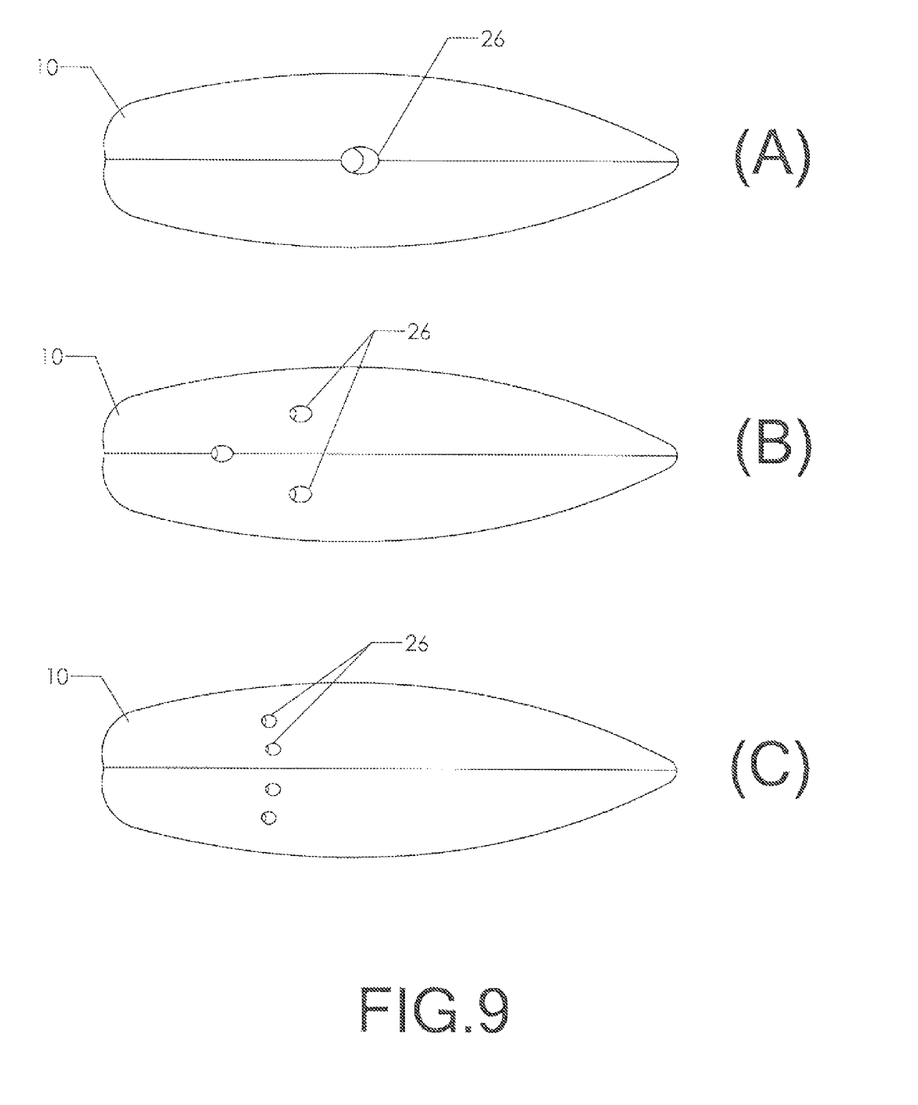
FIG. 9 is a plan view, showing three different embodiments of the present invention.

In order to create the desired air film beneath the aft portion of the surfboard, it may be necessary to provide two or more vents in a pattern. FIG. 9 provides a plan view for three different embodiments. The upper surfboard 10 has a single large vent 26. The middle board has an array of three staggered vents 26. The bottom board has a linear array of four vents 26. The invention is by no means limited to any particular number or configuration of vents. Some embodiments may have ten or more vents in various locations.

Figure 10:
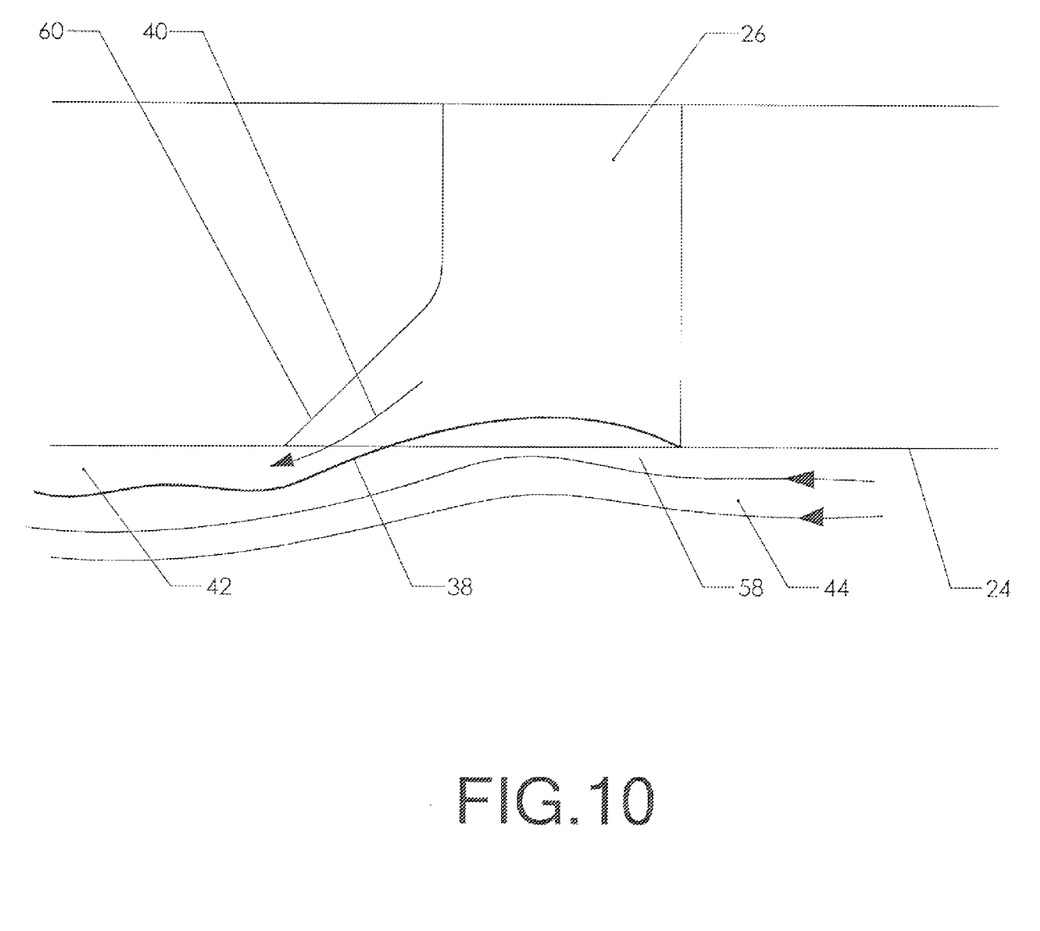
FIG. 10 is a detailed elevation view, showing an alternate embodiment for the present invention.

In the preceding examples a simple cylindrical cavity is used for the vent. This is a very easy shape to create, since it involves simply drilling a hole through the board at a desired angle. It may be desirable in some instances, however, to employ a more complex shape for the vent. FIG. 10 shows an additional embodiment in which vent 26 has a non-uniform cross section as it proceeds from top to bottom. The reader will observe that leading boundary 58 is simply a vertical wall. Trailing boundary 60 is suitably inclined, but only in proximity to the portion of the vent that actually contacts the water.

This embodiment pulls in the entrained air and creates air film 42. However, it uses a complex blended shape for the vent. In studying this shape, the reader will note that the inclination of the trailing boundary is the feature that makes the device produce the desired result. The shape of the other portions of the vent are not critical, as long as they permit enough air to pass.

The preceding description contains significant detail regarding the novel aspects of the present invention. It is should not be construed, however, as limiting the scope of the invention but rather as providing illustrations of the preferred embodiments of the invention. Thus, the scope of the invention should be fixed by the claims presented, rather than by the examples given.

Having described my invention, I claim:

1. A surfboard comprising:
   a. a deck;
   b. a bottom;
   c. a tail;
   d. a vent passing from said deck to said bottom, said vent including,
      i. a top exit connecting said vent to said deck,
      ii. a bottom exit connecting said vent to said bottom, said bottom exit including a leading boundary and a trailing boundary,
      iii. said trailing boundary having an upper extreme and a lower extreme, and
      iv. wherein said lower extreme of said trailing boundary is closer to said tail than said upper extreme.

2. A surfboard as recited in claim 1, wherein said lower extreme is inclined with respect to said deck, with an angle between said lower extreme and said deck being between 10 degrees and 60 degrees.

3. A surfboard as recited in claim 1, wherein said vent comprises a cylinder having a central axis.

4. A surfboard as recited in claim 3, wherein said central axis is inclined with respect to said deck, with an angle between said central axis and said deck being between 10 degrees and sixty degrees.

5. A surfboard as recited in claim 1, further comprising a second vent passing from said deck to said bottom, said second vent including,
   i. a top exit connecting said vent to said deck,
   ii. a bottom exit connecting said vent to said bottom, said bottom exit including a leading boundary and a trailing boundary,
   iii. said trailing boundary having an upper extreme and a lower extreme, and
   iv. wherein said lower extreme of said trailing boundary is closer to said tail than said upper extreme.

6. A surfboard as recited claim 1, further comprising:
   a. a core;
   b. a deck skin; and
   c. a bottom skin.

7. A surfboard as recited in claim 6, further comprising:
   a. a wall skin bounding said vent; and
   b. said wall skin being connected to said top skin and said bottom skin.

8. A surfboard as recited in claim 3, further comprising:
   a. a core;
   b. a deck skin; and
   c. a bottom skin.

9. A surfboard as recited in claim 8, further comprising:
   a. a wall skin bounding said vent; and
   b. said wall skin being connected to said top skin and said bottom skin.

10. A surfboard as recited in claim 2, further comprising:
    a. a core;
    b. a deck skin; and
    c. a bottom skin.

11. A surfboard, comprising:
    a. a deck;
    b. a bottom;
    c. a tail;
    d. an opening connecting said deck to said bottom, said opening including,
       i. a top exit were said opening intersects said deck,
       ii. a bottom exit where said opening intersects said bottom, said bottom exit including a trailing boundary, and
       iii. said trailing boundary being tilted forward with respect to said deck.

12. A surfboard as recited in claim 11, wherein an angle between said lower extreme and said deck is between 10 degrees and 60 degrees.

13. A surfboard as recited in claim 1, wherein said opening comprises a cylinder having a central axis.

14. A surfboard as recited in claim 3, wherein said central axis is inclined with respect to said deck, with an angle between said central axis and said deck being between 10 degrees and sixty degrees.

15. A surfboard as recited in claim 11, further comprising a second opening passing from said deck to said bottom, said second opening including,
    i. a top exit where said opening intersects said deck,
    ii. a bottom exit where said opening intersects said bottom, said bottom exit including a trailing boundary, and
    iii. said trailing boundary being tilted forward with respect to said deck.

16. A surfboard as recited in claim 11, further comprising:
    a. a core;
    b. a deck skin; and
    c. a bottom skin.

17. A surfboard as recited in claim 16, further comprising:
    a. a wall skin bounding said vent; and
    b. said wall skin being connected to said top skin and said bottom skin.

18. A surfboard as recited in claim 13, further comprising:
    a. a core;
    b. a deck skin; and
    c. a bottom skin.

19. A surfboard as recited in claim 18, further comprising:
    a. a wall skin bounding said vent; and
    b. said wall skin being connected to said top skin and said bottom skin.

20. A surfboard as recited in claim 12, further comprising:
    a. a core;
    b. a deck skin; and
    c. a bottom skin.

* * * * *